K. O. SCHAUMAN.

BUMPER ACTUATED VEHICLE CONTROL MECHANISM.

APPLICATION FILED JULY 18, 1922.

Reissued Oct. 10, 1922. 15,467.

3 SHEETS—SHEET 1.

Inventor
Karl Oskar Schauman
By Miller Henry & Boykin
Attorneys.

K. O. SCHAUMAN.
BUMPER ACTUATED VEHICLE CONTROL MECHANISM.
APPLICATION FILED JULY 18, 1922.
Reissued Oct. 10, 1922.
15,467.
3 SHEETS—SHEET 2.
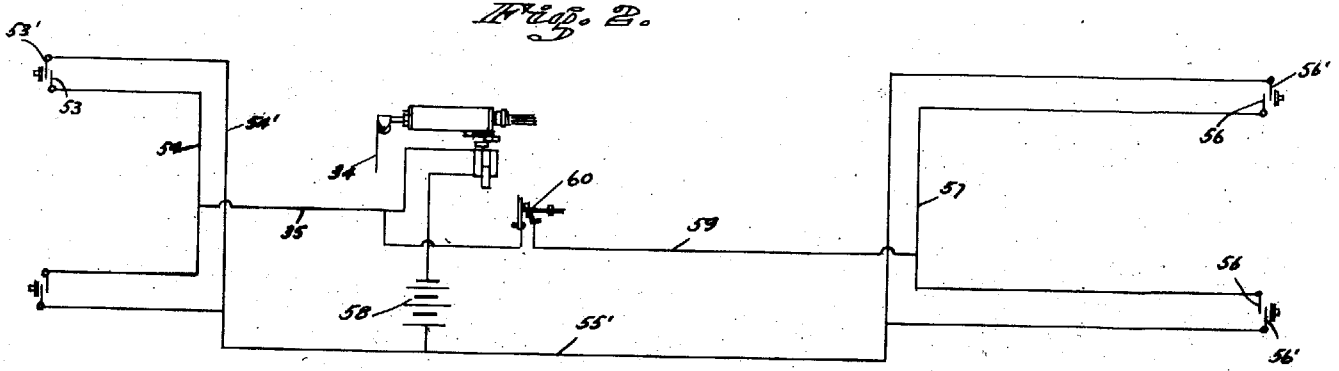
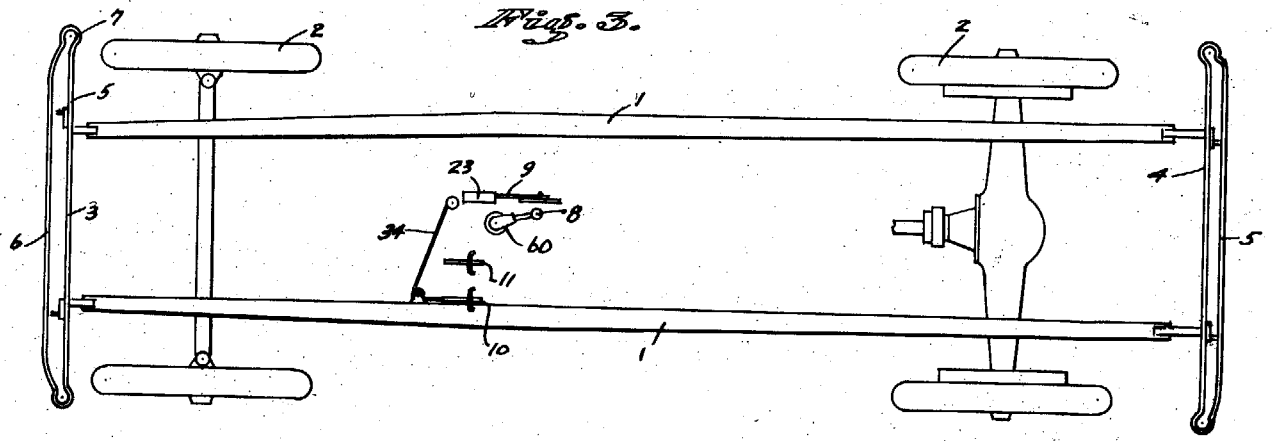
Inventor
Karl Otto Schauman
By Miller Henry & Byhen
Attorneys.

K. O. SCHAUMAN.

BUMPER ACTUATED VEHICLE CONTROL MECHANISM.

APPLICATION FILED JULY 18, 1922.

Reissued Oct. 10, 1922. 15,467.

3 SHEETS—SHEET 3.

Inventor
Karl Oster Schauman.

By Miller Henry & Boykin
Attorneys.

Reissued Oct. 10, 1922. Re. 15,467

UNITED STATES PATENT OFFICE.

KARL OSTEN SCHAUMAN, OF SAN FRANCISCO, CALIFORNIA, ASSIGNOR TO W. H. AVERY.

BUMPER-ACTUATED VEHICLE CONTROL MECHANISM.

Original No. 1,398,399, dated November 29, 1921, Serial No. 371,384, filed April 5, 1920. Application for reissue filed July 18, 1922. Serial No. 575,883.

*To all whom it may concern:*

Be it known that I, KARL OSTEN SCHAUMAN, a subject of Sweden, residing at the city and county of San Francisco and State of California, have invented certain new and useful Improvements in Bumper-Actuated Vehicle Control Mechanism, of which the following is a specification.

The present invention relates to an apparatus for automatically interrupting the momentum of a vehicle and bringing the same to stop after the same encounters an object, either during the forward or rearward movement of the vehicle, thereby minimizing the damage to the object or the vehicle.

The principal objects of this invention are the provision of impact receiving members, preferably in the form of bumpers, associated with the front and rear end of the vehicle and connected in such manner with the drive mechanism of the vehicle, preferably the clutch, and with the brake mechanism, preferably the emergency brake, so that on the encountering of an object by the bumpers or impact receiving members, the emergency brake is automatically applied and the clutch is automatically released.

A further object is to provide means associated with the impact actuated devices, whereby the action of the bumper at the rear of the machine, relative to the other operating units, is disconnected during such time as the vehicle is traveling in a forward direction, and is only in operative connection during the rearward movement of the vehicle. A further object is to provide a construction associated with the emergency brake and clutch whereby the same are capable of being operated simultaneously, and a further object is to provide a construction preferably electrically operated and which is actuated independently of any act of the operator after an object has been engaged by the bumper.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction, within the scope of the claims may be resorted to without departing from the spirit or sacrificing any of the advantages of the invention.

To more fully comprehend the invention, reference is directed to the accompanying drawings wherein—

Fig. 2 is a diagrammatic plan view of the electric wiring circuit to be employed in connection with the preferred embodiment of my invention.

Fig. 3 is a view in plan of a portion of a motor driven vehicle with the control levers and pedals illustrated, and a portion of my invention connected therewith.

Figure 1:
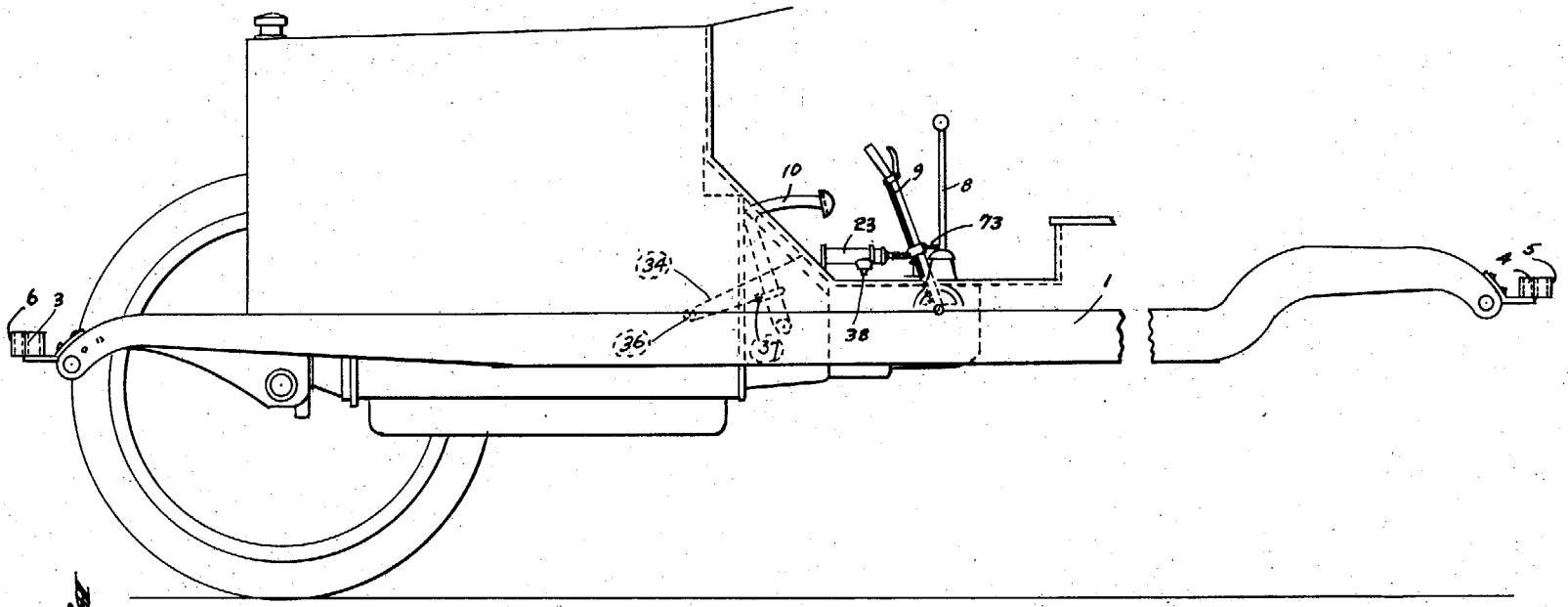
Figure 1 is a view in side elevation disclosing, in broken, outline, a motor driven vehicle with the preferred embodiment of my invention incorporated therein.

Referring more particularly to the drawings, wherein like characters of reference designate corresponding parts, the numeral 1 indicates a motor vehicle frame; 2 the supporting wheels, and at the front end of the frame is positioned a suitable form of impact receiving member or bumper 3, and a like construction 4 is associated with the rear end of the vehicle frame. In the drawings the bumpers are illustrated in the form of rear or stationary portions 5 and the front or impact receiving portions 6 spaced therefrom and connected at their ends with the rear portions 5 by the spring or yieldable curved integral members or portions 7.

The vehicle is provided with the usual control elements in the form of a gear shift lever 8, emergency brake 9, clutch control pedal 10 and foot brake 11, partially illustrated in Figs. 1 and 3 of the drawings.

Figure 4:
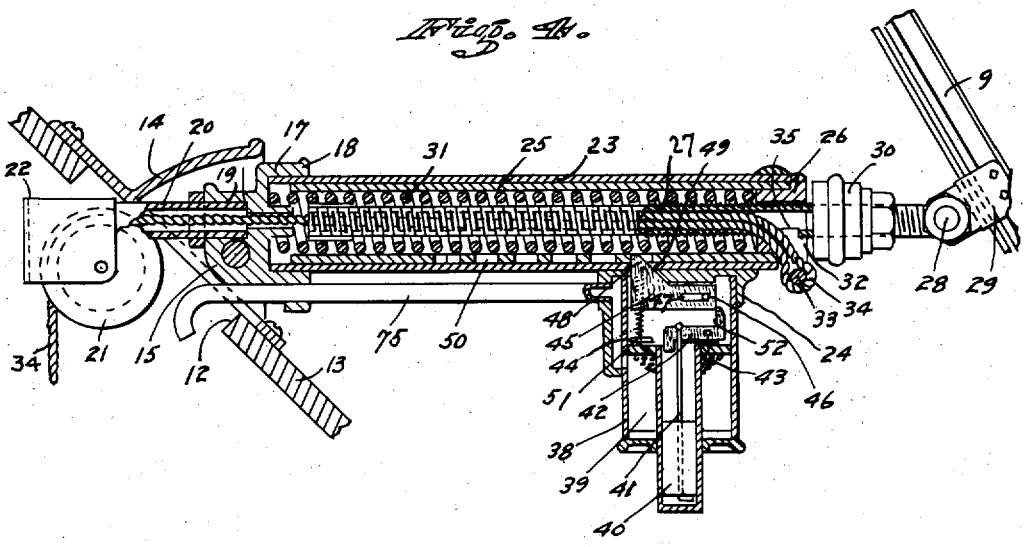
Fig. 4 is an enlarged longitudinal sectional view of the electrically controlled, mechanically actuated, mechanism for operating the emergency brake and releasing the clutch pedal.
Figure 6:
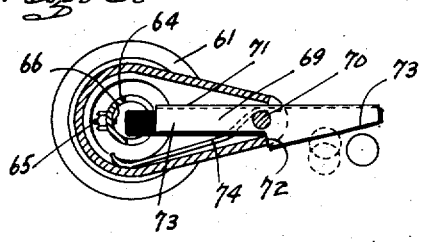
Figure 6 is a sectional view taken on line VI—VI of Fig. 5.
Figure 5:
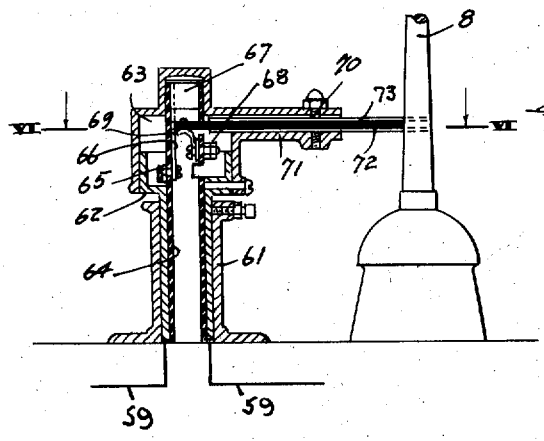
Fig. 5 is a vertical sectional view of the shift lever control switch for cutting out the electric circuit to the rear impact receiving member.

To simultaneously operate the clutch pedal 10, the emergency brake lever 9, the brake to apply and the clutch to release any suitable mechanism may be used, the preferred form illustrated particularly in Figs. 1 and 4 of the drawings being constructed as follows:

Positioned over an opening 12 in the incline foot board 13 is a hood 14 within the end of which opening into the operator's compartment is pivoted to swing on a horizontal fulcrum 15 a suitable coupling member 17. The member 17 is formed with an annular flange 18 and in its center is provided with a bore 19 into the outer end of which extends a tube 20 carrying at its free end a sheave 21 over which lies a protecting hood 22. From the annular flange 18 extends a tubular casing 23 and the same at its outer end supports a collar 24 surrounding same.

Slidably mounted within the casing 23 is a suitable plunger forming guide tube 25 closed at its outer end by a ring 26 through which extends a threaded tubular shaft 27 disposed in line with the bore 19 of the member 17, the shaft being freely slidable through the ring 26. The outer end of the threaded member 27 is fulcrumed as at 28 to a bracket 29 clamped to the emergency brake lever 9, and an abutment collar 30 is carried by the outer end of the member 27 to approximately contact with the ring 26 when the threaded member 27 is in its innermost position, as in Fig. 4 of the drawings. The abutment 30 provides a surface with which the collar 26 contacts on the outward movement of the plunger. This construction permits of the operation of the lever 9 independently of the operation of the plunger 25.

Coiled about the threaded member 27 with one end abutting against the member 17 within the flange 18 and with the other end abutting against the ring 26, is an operating spring 31 for forcing the tube 25 outwardly to automatically apply the emergency brake 9 on the release of a hereinafter described mechanism.

The collar 26 is provided with a lateral opening 32 and said collar carries, adjacent said opening, a transverse pin 33 about which is looped or drawn a flexible cord or member 34 extending into the center of the threaded member 27 through an opening 35 in its side wall, and with one end extending upwardly through said member 27, through the bore 19, tube 20 and around the sheave 21, said member passing around a second sheave 36 and connected at its free end as at 37, to the clutch control pedal 10. This construction permits the manual operation of the brake lever 9 and the reciprocation of the threaded member 27 within the plunger 25 without affecting the operation of the clutch pedal 10 or the operation of the plunger 25. The inner end of the flexible member 34 is secured in any suitable manner to the threaded member 27 and the adjustment of the flexible member about the pin 33 enables the proper tension to be placed on the flexible member, whereby on the projecting of the plunger tube 25 from the casing 23 the clutch pedal is simultaneously operated to release the clutch during the application of the emergency brake 9.

The means for controlling the operation of the spring actuated mechanism associated with the pedal 10 and brake lever 9 is preferably constructed in the following manner:

The collar 24 supports a casing 38 in which is mounted a coil 39 carrying a core 40. Through the core extends a pin 41 headed at its upper end and loosely extending through a latch 42 pivoted as at 43 to a flange 44 extending downwardly into the casing 38.

Slidable longitudinally of the latch 42 and positioned above the same is a pawl 45 guided in its movement by a pin 46 extending through a slot 47 in the pawl. The forward end of the pawl is pointed as at 48 and projects upwardly through an opening 49 in the top of the flange 24 and is adapted to engage in suitable stops or recesses 50 formed in the side of the tubular plunger 25. A coiled spring 51 disposed vertically with one end associated with the latch 45 and the other end with the flange 44 forces said latch normally upwardly and draws the same normally to a position with the pointed end received within one of the recesses 50 at which time the lipped end 52 of the pawl engages in rear of the latch and maintains the same in the position as in Fig. 4 of the drawings.

On the energizing of the coil 39 in a manner hereinafter described, the core 40 is raised therein, strikes the latch 42 and the operation thereof removes the lip 52 from in rear of the pawl 45 permitting the plunger spring 31 to actuate the plunger to project the same outwardly in the tube 23, the outward movement of the plunger causing a gradual depression of the pawl 45 until the same is released from its associated notch 50, at which time the plunger 25 makes a full stroke outward shifting the brake lever 9 to set the brakes and release the clutch through action on the pedal 10.

For energizing the coil 39 to control the operation of the core 40 on either the front bumper 3 or rear bumper 4 receiving an impact, I prefer to employ the following electric circuit:

Associated with the opposite ends of the front bumper 3 are the spaced contact switches or points 53 and 53′ from which extends respectively the leads 54 and 54′. A lead 55 extends from the lead 54 and connects with the coil 39.

Extending from the lead 54′ is a lead 55′ which branches and terminates at the rear end of the vehicle in the contacts 56′ corresponding to the contacts 53′ at the front of the vehicle.

Disposed in spaced relation to the contacts

56′ and in the same relative position at the rear of the vehicle, as are the front contacts, that is between the rigid and movable portions of the rear bumper, are other contacts 56 from which extend the leads 57. A battery 58 is provided connecting the lead 55′ with the coil 39, and from said battery extends a lead 59 connecting through a suitable hereinafter described switch 60 with the lead 57.

The purpose of the switch 60 is to render inoperative the rear vehicle bumper 4 when the vehicle is travelling in a forward direction, and to render said bumper operative when the vehicle is travelling in a rearward direction, and the same is constructed preferably in the following manner.

Extending upwardly from the horizontal portion of the floor 13 of the front compartment of the vehicle is a tubular support 61 carrying a tubular member 62 closed at its upper end by a cap 63 and upwardly into the tubular member 62 is extended an insulating cylinder 64 through which extend the portions of the lead 59, Fig. 2 of the drawings. One portion of the lead 59 is secured to a binding post 65 from which extends a finger 66 with which engages a movable contact plunger 67 positioned in the extreme upper end of the insulating cylinder 64. The other portion of the lead 59 is connected to a binding post 68 mounting a contact finger 69 disposed directly beneath the lower tapered end of the contact plunger 67 and when said plunger is in contact with the finger, the circuit is complete through the lead 59.

To interrupt the circuit and render inoperative the rear bumper 4, I employ a lever 72—73 mounted to swing on a pivot 70 adjacent the outer end of a lateral slot 71 formed in an arm extending to one side of the closure cap 63, the lever consisting of an inner insulating material 72 and an outer protecting metallic covering 73. The insulating material is adapted on the pivoting of the lever and the movement of the gear shifting rod 8 to reverse driving position to lie without and free of contact with the member 67 and finger 69 and when in this position the gear shift lever 8 is adapted to move over the beveled face 73 of the outer end of the lever.

To normally separate the contacts 67 and 69, I employ a spring 74 within the opening 71 of the lateral arm and the tension of which is to normally maintain the insulating portion of the lever disposed to separate the contacts 67 and 69. The lead 55 and the extension from the battery 58 connect with the coil 39 preferably through a tube 75, Fig. 4 of the drawings.

I claim:

1. In combination with a motor driven vehicle provided with a brake for retarding the movement thereof, a brake lever associated therewith, a bumper carried by the vehicle, electrically controlled means connected therewith and with said brake lever and thrown into operation on said bumper engaging an object for operating said brake lever to actuate the brake to retard the movement of the vehicle.

2. In combination with a motor driven vehicle provided with a brake and a clutch mechanism, a brake lever associated with the brake mechanism and a clutch pedal associated with the clutch mechanism, a bumper associated with the vehicle, an electrically releasable means connected with the bumper and with said brake lever and clutch pedal and thrown into operation on said bumper contacting with an object, said electrically releasable means automatically operating said lever and pedal for applying the brake and releasing the clutch.

3. In combination with a motor driven vehicle provided with means for controlling the direction of movement thereof, a brake associated with the vehicle, a bumper at the front and rear ends of the vehicle, means connected with said bumpers and associated with the brake for operating the same to retard the momentum of the vehicle on an impact being delivered to the bumpers, and means operated in accordance with the direction of movement of the vehicle for rendering inoperative one of said bumpers.

4. In combination with a vehicle brake lever and its associated brake, a plunger connected with the lever and capable of projection for moving the lever to operative position, a coiled spring for operating the plunger, a releasable latch for retaining the plunger in a retracted position and a solenoid operated from distant point for releasing said plunger retaining means.

5. In combination with a vehicle brake lever, and its associated brake, of a spring actuated plunger connected with the lever and adapted for projecting to move the lever to apply its associated brake, electrically controlled flexible means for retaining said plunger in its retracted position, a bumper associated with the vehicle, a circuit from the releasable means to the bumper, and a switch in said circuit adapted for operation on said bumper impacting with an object whereby said releasable means is operated to permit said plunger to apply the vehicle brake.

6. In combination with a vehicle brake lever, of an elongated member pivotally connected thereto, a shoulder on said member, a tubular plunger for receiving said member and within which said member is capable of free longitudinal movement on the manual operation of the lever, means for projecting the plunger, means for retaining the plunger in retracted position, an impact receiving member associated with the vehicle and devices operated on the impact receiving member receiving an impact for releasing the retaining means to permit operation of the projector to operate the brake lever.

7. In combination with a motor driven vehicle provided with a brake lever and a clutch pedal capable of operation independently of each other, an impact receiving member associated with the vehicle, a spring for operating said lever and pedal and normally held under compression, electrical means actuated on an impact being delivered to the impact receiving member for automatically releasing said spring to permit the same to operate said brake lever and clutch pedal, said pedal and lever being capable of operation independently of said actuated means.

8. In a motor operated vehicle having brakes; electric circuit connections including contacts on an exposed part of the vehicle adapted to engage an obstacle and close the circuit, electromagnetic means adapted to be operated by said circuit and comprising a spring and connections adapted to actuate the vehicle brakes when said spring is released, and releasing means for said spring actuated when said circuit energizes said electromagnetic means.

9. In a motor operated vehicle having brakes, electric circuit connections including contacts on an exposed part of the vehicle adapted to engage an obstacle and close the circuit, electromagnetic means adapted to be operated by said circuit and comprising a spring and connections adapted to actuate the vehicle brakes when said spring is released, and releasing means for said spring actuated when said circuit energizes said electromagnetic means, and a hand operable lever adapted to restore said spring.

10. In a motor operated vehicle having brakes, electric circuit connections including contacts on an exposed part of the vehicle adapted to engage an obstacle and close the circuit, electromagnetic means adapted to be operated by said circuit, mechanism adapted to actuate the vehicle brakes and to interrupt the motor operating connections when said mechanism is released, and releasing means for said mechanism actuated by said electromagnetic means.

11. In a motor operated vehicle having brakes, electric circuit connections including contacts on an exposed part of the vehicle adapted to engage an obstacle and close the circuit, electromagnetic means adapted to be operated by said circuit, mechanism adapted to actuate the vehicle brakes and to interrupt the motor operating connections when said mechanism is released, and releasing means for said mechanism actuated by said electromagnetic means, and a device adapted to restore said mechanism after said action.

12. In a motor operated vehicle having brakes, electric circuit connections including contacts on the front and rear portions of the vehicle adapted to engage an obstacle and close the circuit, electromagnetic means adapted to be operated by said circuit and comprising a spring and connections adapted to actuate the vehicle brake when said spring is released, and releasing means for said spring actuated when said circuit energizes said electromagnetic means.

13. In a motor operated vehicle having brakes, electric circuit connections including contacts on the front and rear portions of the vehicle adapted to engage an obstacle and close the circuit, electromagnetic means adapted to be operated by said circuit and comprising a spring and connections adapted to actuate the vehicle brake when said spring is released, and releasing means for said spring actuated when said circuit energizes said electromagnetic means, and a lever to restore said spring.

14. In a motor operated vehicle having brakes, electric circuit connections including contacts on the front and rear portions of the vehicle adapted to engage an obstacle and close the circuit, electromagnetic means adapted to be operated by said circuit and comprising a spring and connections adapted to actuate the vehicle brake and to interrupt the motor operating connections when said spring is released, and releasing means for said spring actuated when said circuit energizes said electromagnetic means.

15. In a motor operated vehicle having brakes, electric circuit connections including contacts on the front and rear portions of the vehicle adapted to engage an obstacle and close the circuit, electromagnetic means adapted to be operated by said circuit and comprising a spring and connections adapted to actuate the vehicle brake and to interrupt the motor operating connections when said spring is released, and releasing means for said spring actuated when said circuit energizes said electromagnetic means and a lever to restore said spring.

16. In a motor operated vehicle having brakes, electric circuit connections including contacts on the front and rear portions of the vehicle adapted to engage an obstacle and close the circuit, electromagnetic means adapted to be operated by said circuit and adapted to actuate the vehicle brake when said means is released, and a releasing device for said means actuated when said circuit energizes said electromagnetic means and a switch in the circuit connections to said rear contacts and connected with the motor operated portions of the vehicle and normally maintaining the rear contact circuit open unless the vehicle is backed and at such times automatically closing said circuit to said rear contacts.

17. In a motor operated vehicle having brakes, electric circuit connections including contacts on the front and rear portions of the vehicle adapted to engage an obstacle and close the circuit, electromagnetic means adapted to be operated by said circuit and comprising a spring and connections adapted to actuate the vehicle brake when said spring is released, releasing means for said spring actuated when said circuit energizes said electromagnetic means, and a lever to restore said spring, and a switch in the circuit connections to said rear contacts and connected with the motor operated portions of the vehicle and normally maintaining the rear contact circuit open unless the vehicle is backed and at such times automatically closing said circuit to said rear contacts.

18. In a motor operated vehicle having brakes, electric circuit connections including contacts on the front and rear portions of the vehicle adapted to engage an obstacle and close the circuit, electromagnetic means adapted to be operated by said circuit and comprising a spring and connections adapted to actuate the vehicle brake and to interrupt the motor operating connections when said spring is released, releasing means for said spring actuated when said circuit energizes said electromagnetic means, and a switch in the circuit connections to said rear contacts and connected with the motor operated portions of the vehicle and normally maintaining the rear contact circuit open unless the vehicle is backed and at such times automatically closing said circuit to said rear contacts.

19. In a motor operated vehicle having brakes, electric circuit connections including contacts on the front and rear portions of the vehicle adapted to engage an obstacle and close the circuit, electromagnetic means adapted to be operated by said circuit and comprising a spring and connections adapted to actuate the vehicle brake and to interrupt the motor operating connections when said spring is released, and releasing means for said spring actuated when said circuit energizes said electromagnetic means and a lever to restore said spring and a switch in the circuit connections to said rear contacts and connected with the motor operated portions of the vehicle and normally maintaining the rear contact circuit open unless the vehicle is backed and at such times automatically closing said circuit to said rear contacts.

KARL OSTEN SCHAUMAN.